United States Patent [19]
Merritt et al.

[11] Patent Number: 5,919,279
[45] Date of Patent: Jul. 6, 1999

[54] SELF CONTAINED HEAVY-DUTY AIR FILTER

[75] Inventors: Steven J. Merritt; Allen J. Liibbe, both of Kearney, Nebr.

[73] Assignee: Baldwin Filters, Inc., Kearney, Nebr.

[21] Appl. No.: 09/016,498

[22] Filed: Jan. 30, 1998

[51] Int. Cl.⁶ ................................................. B01D 46/02
[52] U.S. Cl. ........................... 55/385.3; 55/498; 55/502; 55/503; 55/514; 55/521
[58] Field of Search .................................. 55/385.3, 502, 55/503, 514, 521, 498

[56] References Cited

U.S. PATENT DOCUMENTS

| | | |
|---|---|---|
| 1,898,027 | 2/1933 | Winslow . |
| 2,463,722 | 3/1949 | Spraragen . |
| 2,959,248 | 11/1960 | Thornburgh . |
| 2,962,121 | 11/1960 | Wilber . |
| 2,966,960 | 1/1961 | Rochlin . |
| 3,078,650 | 2/1963 | Anderson et al. . |
| 3,123,456 | 3/1964 | Boltz et al. . |
| 3,147,100 | 9/1964 | Wilber . |
| 3,209,522 | 10/1965 | Nülsson ..................................... 55/373 |
| 3,399,515 | 9/1968 | Hahl . |
| 3,429,108 | 2/1969 | Larson . |
| 3,508,383 | 4/1970 | Humbert, Jr. et al. . |
| 3,616,618 | 11/1971 | Gronholz et al. . |
| 3,672,130 | 6/1972 | Sullivan et al. . |
| 3,961,921 | 6/1976 | Heiman et al. ............................ 55/373 |
| 4,350,509 | 9/1982 | Alseth et al. . |
| 4,587,890 | 5/1986 | Hurlburt ................................. 55/385.3 |
| 4,775,469 | 10/1988 | Zimmerly .................................... 55/373 |
| 5,112,372 | 5/1992 | Boeckermann et al. . |
| 5,484,466 | 1/1996 | Brown et al. ............................. 55/514 |
| 5,484,529 | 1/1996 | Malugade et al. ........................ 55/373 |
| 5,556,440 | 9/1996 | Mullins et al. ........................... 55/502 |
| 5,685,985 | 11/1997 | Brown et al. ............................. 55/514 |
| 5,725,624 | 3/1998 | Ernst et al. ............................... 55/502 |
| 5,730,768 | 3/1998 | Kaminaga et al. ....................... 55/502 |
| 5,730,769 | 3/1998 | Dungs et al. .......................... 55/385.3 |
| 5,755,842 | 5/1998 | Patel et al. ............................... 55/503 |
| 5,755,843 | 5/1998 | Sundquist ................................. 55/502 |

*Primary Examiner*—Jay H. Woo
*Assistant Examiner*—Minh-Chau T. Pham
*Attorney, Agent, or Firm*—Leydig, Voit & Mayer Ltd.

[57] ABSTRACT

A replaceable air filter for filtering inlet air to an engine has a heavy-duty housing which protects the filter element from heat and damage due to improper handling. The durable housing further provides additional surfaces for mounting the air filter to a combustion engine. The filter element inside the housing is permanently sealed to the housing, thereby reducing the risk of unfiltered air from bypassing the filter element to enter the air intake tube. Because the filter element is permanently attached to the housing, the entire air filter must be replaced during routine maintenance, thereby reducing the risk of loose dirt from spent filters being drawn into the engine. A snout member is injection molded to have an air outlet which may be sized for connection with either a flexible or rigid air intake tube.

13 Claims, 6 Drawing Sheets

SELF CONTAINED HEAVY-DUTY AIR FILTER

FIELD OF THE INVENTION

This invention relates to filters, and more particularly to replaceable air filters.

BACKGROUND OF THE INVENTION

Air filters are commonly used to filter the air supply to a standard internal combustion engine, e.g., automotive engines, truck or heavy equipment engines, and stationary power sources. The intake air must be filtered to remove dust, dirt, and other contaminants which may damage or reduce the efficiency of the engine. In all of these applications, the filter must be changed periodically.

Conventional air filters have a permanent housing which is openable for access to a filter element which is located inside the housing. To perform a filter change, the housing is opened, the filter element removed, a new filter inserted into the housing, and the housing closed. The housing is connected to the engine through an intake air tube. Unfortunately, conventional air filters present a number of significant disadvantages.

The use of conventional air filters creates an increased risk of unfiltered air reaching the engine. As noted above, conventional air filters have a removable filter element located inside the filter housing. Accordingly, it will be appreciated that the filter element must sealingly engage the interior of the housing to prevent unfiltered air from bypassing the filter element. It is difficult, however, to ensure that an airtight seal has been formed. The filter element must be inserted in the housing so that it is properly oriented with the sealing structure of the housing interior. Furthermore, the filter element is not permanently placed inside the housing but instead is routinely replaced, thereby requiring accurate installation on a regular basis. The use of a number of different elements with a single filter housing creates the potential for inconsistencies in the different filter elements which may affect the quality of the seal formed with the housing. Finally, dirt or other foreign material may contaminate the sealing surface, thereby reducing the chances of forming a complete seal.

Conventional air filters are also overly burdensome to replace. When removing and replacing a filter element from a filter housing, care must be taken to prevent dirt or other debris from entering the air intake tube and, ultimately, the engine. It will be appreciated that during operation, dirt particles collect in the filter element and on the interior surface of the housing. During filter element replacement, the filter element is often tipped or bumped in a manner which knocks loose dirt particles from the element and into the housing, thereby adding to the amount of particles already collected on the interior surface of the housing. The housing therefore must be thoroughly cleaned during filter changes to prevent dirt from reaching the air intake tube. Extra care must be taken to ensure that the dirt is actually removed, rather than relocated, during cleaning, since any remaining dirt will be drawn into the engine during subsequent operation. Particular attention must be given to the sealing surface of the housing so that an optimum sealing surface is obtained. The cleaning of the housing and the care which must be taken during filter element removal make conventional air filters overly costly, burdensome, and time consuming to replace.

Conventional air filters further create additional costs for OEM applications. Engine manufacturers must fabricate and assemble the filter housings. The manufacturer must not only provide the raw materials to form the housing, but must also have appropriate tooling on hand to fabricate the housings. Tooling costs are significant, considering the relatively low volume of housings (i.e., one per engine) needed compared to the multiple filter elements required during the life of the engine. Because of the low volume, the per unit costs to OEM manufacturers to fabricate filter housings is overly high.

Alseth et al., U.S. Pat. No. 4,350,509, discloses a disposable air cleaner in which the filter element is permanently attached to the filter housing, thereby addressing some of the shortcomings noted above. Alseth, however, discloses end caps made entirely of a lightweight material, such as urethane, which is directly exposed to the operating environment of the air filter. As a result, it has been found that the housing of the Alseth device is susceptible to mechanical and thermal damage. For example, at the high temperature end, it has been found that the device of Alseth tends to deform at around 210–230° F.

In addition, to properly support the device of Alseth, the engine manufacturer must provide a rigid air intake tube which extends entirely through an inner aperture of the filter. It will be appreciated that the end of the air intake tube inserted into the Alseth device must further be perforated to allow air flow through the filter. Alseth therefore requires specially formed parts for mounting and therefore is overly costly to engine manufacturers. Furthermore, the device of Alseth requires additional engine space so that the filter may be slid over the air intake tube.

SUMMARY OF THE INVENTION

In light of the foregoing, it is an object of the present invention to provide a replaceable air filter suitable for heavy-duty applications.

In that regard, it is an object of the present invention to provide a replaceable air filter which can withstand extremely hot and cold operating temperatures.

Another detailed object of the present invention is to provide a replaceable air filter having a structurally durable housing for mounting the air filter to the engine.

Another object of the present invention is to provide a replaceable air filter which minimizes the risk of unfiltered air bypassing the filter element.

Still another object of the present invention is to provide a replaceable air filter which is easily disposed of and recycled.

Accordingly, it is a feature of the present invention to provide an air filter in which a filter element is secured permanently inside a filter housing. The entire air filter, including the housing, is then replaced during routine maintenance, thereby minimizing the risk of dirt particles reaching the air intake tube. The present invention further features a housing of heavy-duty construction which increases the options for securing the air filter to the engine and protects the filter element from excessive temperatures and damage due to improper handling. More specifically, the air filter has a first end cap made of metal and a second end cap comprising an outer metal ring insert molded into a snout member. A metal outer shell connects the end caps to complete the housing. As a result, the air filter of the present invention provides a highly durable housing which may be used to mount the air filter near the engine, such as by using a band clamp around the outer shell or mounting the filter off of a rigid air intake tube.

A subsidiary feature of certain embodiments of the present invention is the use of reverse draft grooves in the snout to ensure the sealing engagement between the filter element and the second end cap. During potting of the filter element with the second end cap, the potting material is allowed to seep into the grooves. Once the potting material solidifies, the shape of the grooves is such that they resist forces which tend to pull the filter element away from the end cap. The grooves therefore provide a mechanical sealing means for ensuring a sealing connection between the filter element and the end cap.

These and other objects, advantages, and features of the present invention will become more apparent from the following detailed description when taken in conjunction with the accompanying drawings.

Figure 1:
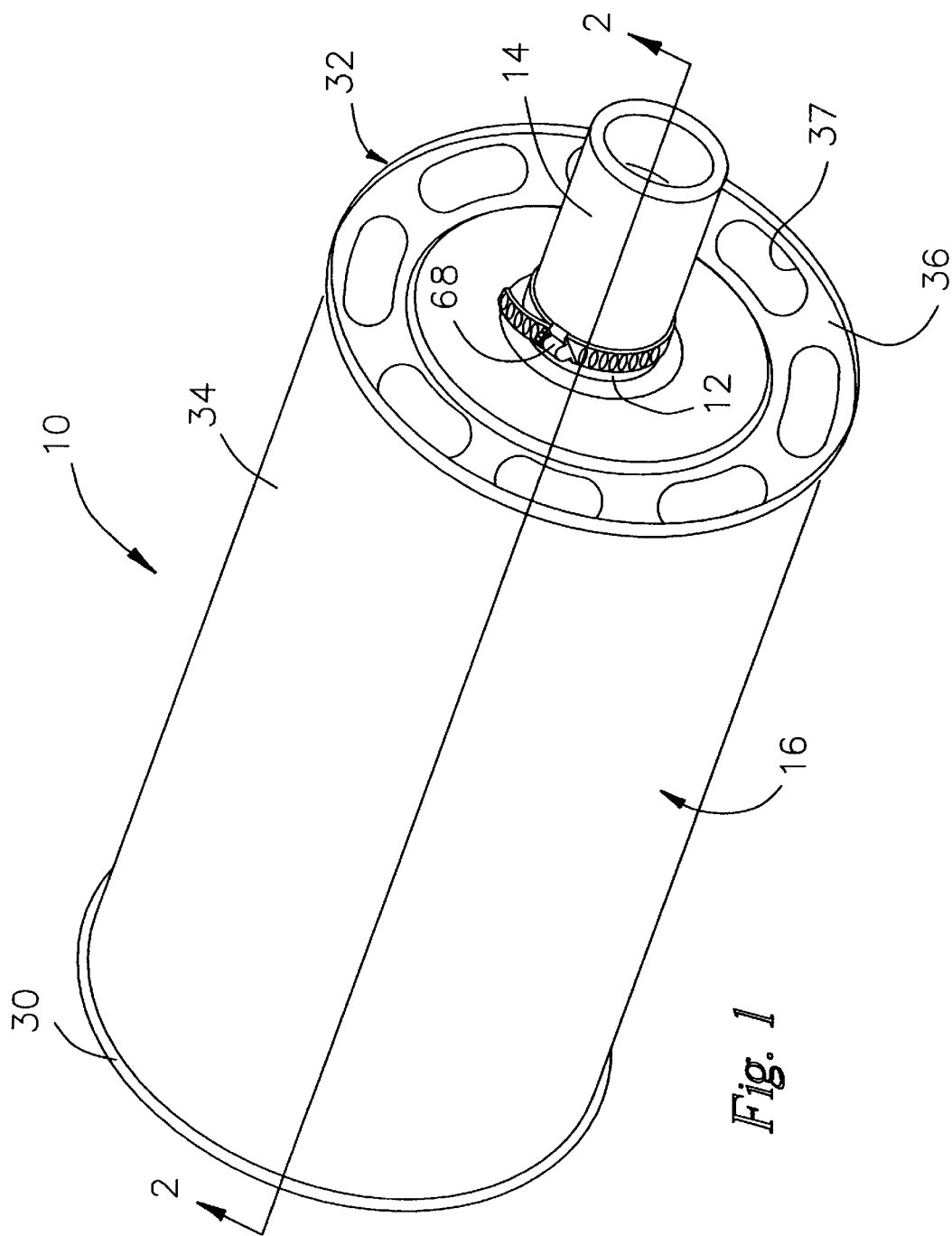
FIG. 1 is a perspective view showing an air filter constructed in accordance with the present invention connected to a flexible air intake tube.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention as defined by the appended claims.

DETAILED DESCRIPTION OF THE PREFERRED EMBODIMENTS

For purposes of illustration, the invention is shown in FIG. 1 as embodied in an air filter 10 having a snout member 12 adapted for engagement with an air intake tube 14 leading to an internal combustion engine (not shown). As described in greater detail below, the air filter 10 may be attached to either a rigid or a flexible air intake tube 14. The air filter 10 also has a durable housing 16 suited for low temperature (i.e. less than 0° F.) and high temperature (i.e. 240° F. or more) applications, and which may be used to mount the air filter near the engine.

Figure 2:
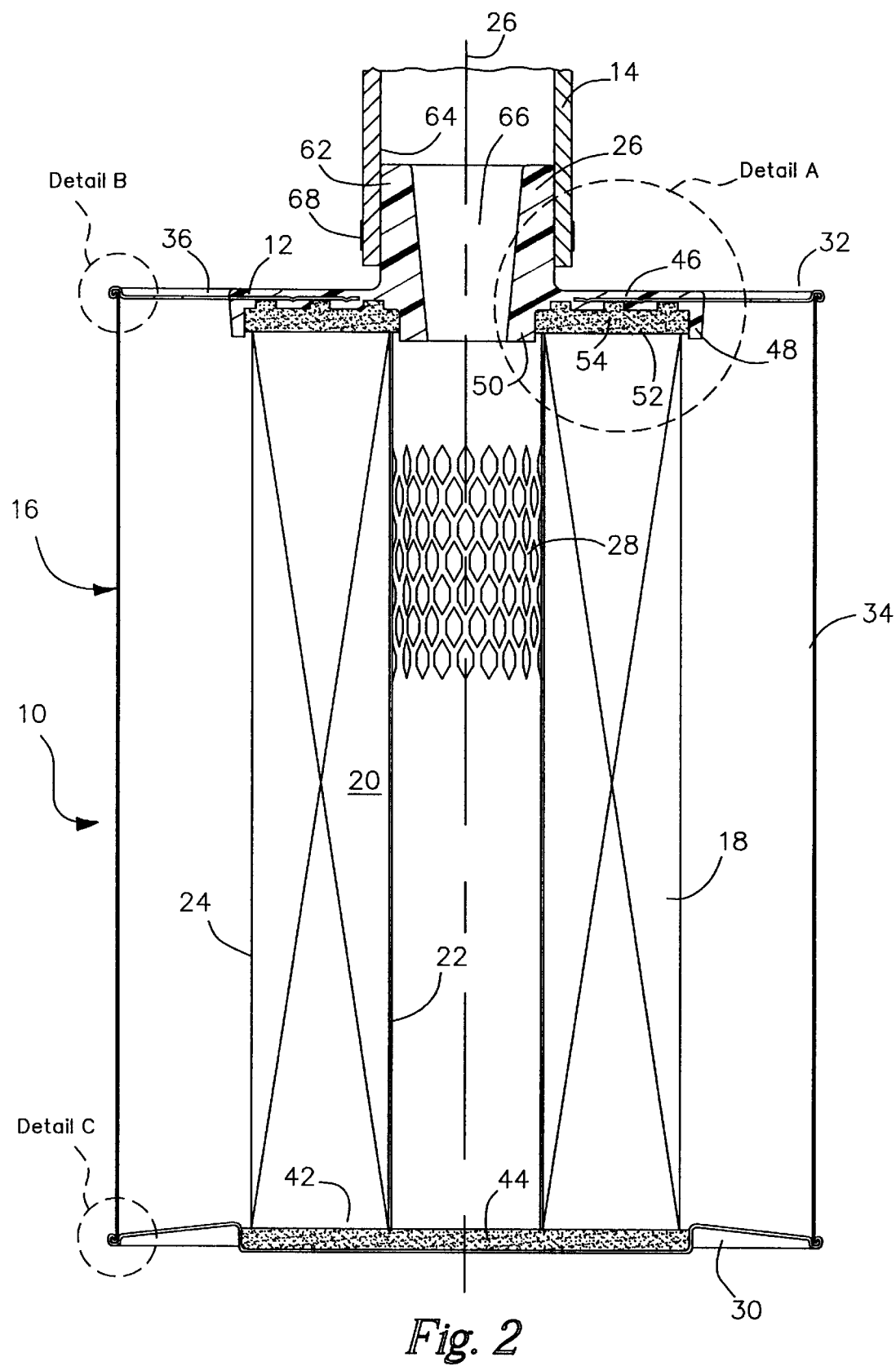
FIG. 2 is a cross-sectional view of the air filter taken along line 2—2 of FIG. 1.

Referring to the air filter 10 in greater detail, it will be seen that the present invention includes a filter element 18 for filtering dust, dirt, and other particulates from the engine intake air stream. As best shown in FIG. 2, the filter element 18 comprises a filter media 20 arranged in a cylinder extending along an axis 26 and defining an inner bore 22 and outer periphery 24. The filter media 20 is preferably of the paper type having a relatively conventional pleated construction. Other forms of filter media are also usable.

A center tube 28 extends through the inner bore 22 adjacent the filter element 18 to support the filter media against radially compressive forces. The center tube 28 is preferably formed from expanded steel, however, other materials which are rigid, yet allow air to pass through, may be used in accordance with the present invention.

The housing 16 is substantially concentric with and surrounds the filter element 18. As illustrated in FIGS. 1 and 2, the housing 16 comprises first and second end caps 30, 32 and an outer shell 34 extending therebetween to complete the housing. The first end cap 30 is formed preferably of metal and is shaped to receive one end of the filter element 18. The second end cap 32 is set out in greater detail below. For present purposes, however, it will be noted that the second end cap 32 comprises a metal outer ring 36 insert molded with a snout member 12 to form a composite end cap. As best shown in FIG. 2, the outer ring 36 forms an outer portion of the second end cap 32 while the snout member 12 forms an inner portion. As illustrated in FIG. 1, a plurality of inlets 37 extend through the housing 16 for allowing air flow into the filter 10. While the inlets 37 are shown in the outer ring 36, it will be appreciated that inlets may also be formed in the first end cap 30.

Figures 4, 7:
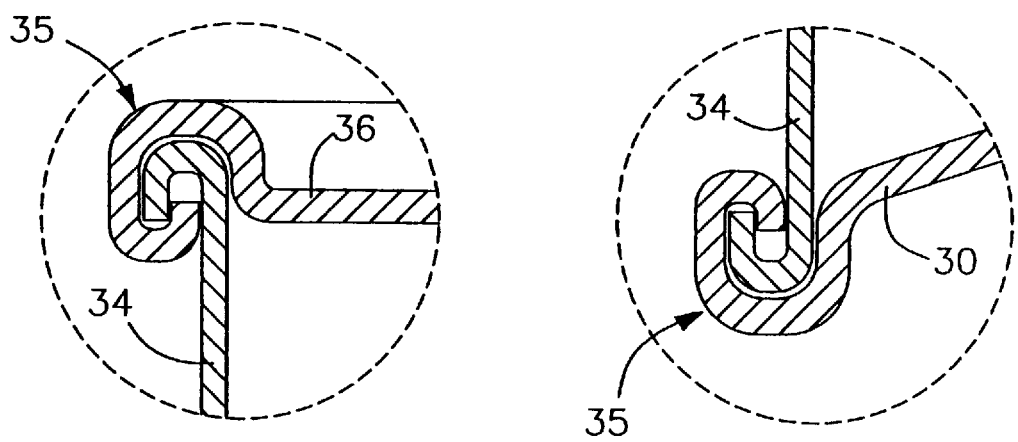
FIG. 4 is an enlarged view of Detail B of FIG. 2 showing the connection of the outer shell with a second end cap.
FIG. 7 is an enlarged view of Detail C of FIG. 2 showing the connection of the outer shell with a first end cap.

The outer shell 34 extends between the first and second end caps 30, 32 to enclose the filter element 18. The outer shell 34 is preferably made of metal so that the edges of the outer shell 34 and end caps 30, 32 may be rolled to form lock seams 35. As best shown in FIG. 4, the outer ring 36 of the second end cap 32 is rolled with one end of the outer shell 34 to form a lock seam 35. Similarly, the first end cap 30 is rolled with the other end of the outer shell 34 to form another lock seam 35 (FIG. 7). It will be appreciated that the lock seams 35 not only close the housing 16, but also provide additional strength to the housing 16.

In the preferred embodiment, the outer metal ring 36 is formed with ridges 40 (FIG. 3) to improve the structural strength of the second end cap 32. When the end caps 30, 32 are joined with the outer shell 34, the resulting structure is a heavy-duty housing 16 capable of protecting the filter element 18 from excessive heat and damage from improper handling. The metal construction of the housing 16 allows the air filter 10 to be mounted from the housing, such as by straps or a large band clamp placed around the outer shell 34 and attached to the engine or supporting structure from the engine. In the alternative, the housing may be mounted in cantilever fashion off of a rigid air intake tube. The durable housing 16 also allows the air filter 10 to operate over a temperature range of at least −40° to 250° F.

The filter element 18 is permanently attached to the first and second end caps 30, 32 to reduce the risk of unfiltered air bypassing the filter element 18. As best shown in FIG. 2, the ends of the filter element 18 are potted into the first and second end caps 30, 32. The first end cap 30 has a recess 42 sized to accept one end of the filter element 18. The recess 42 also allows potting material 44 to be deposited therein to create a sealing engagement between the filter element 18 and the first end cap 30. The potting material 44 used at the first end cap 30 is preferably plastisol, however almost any potting material known in the art may be used in accordance with the present invention.

Figure 3:
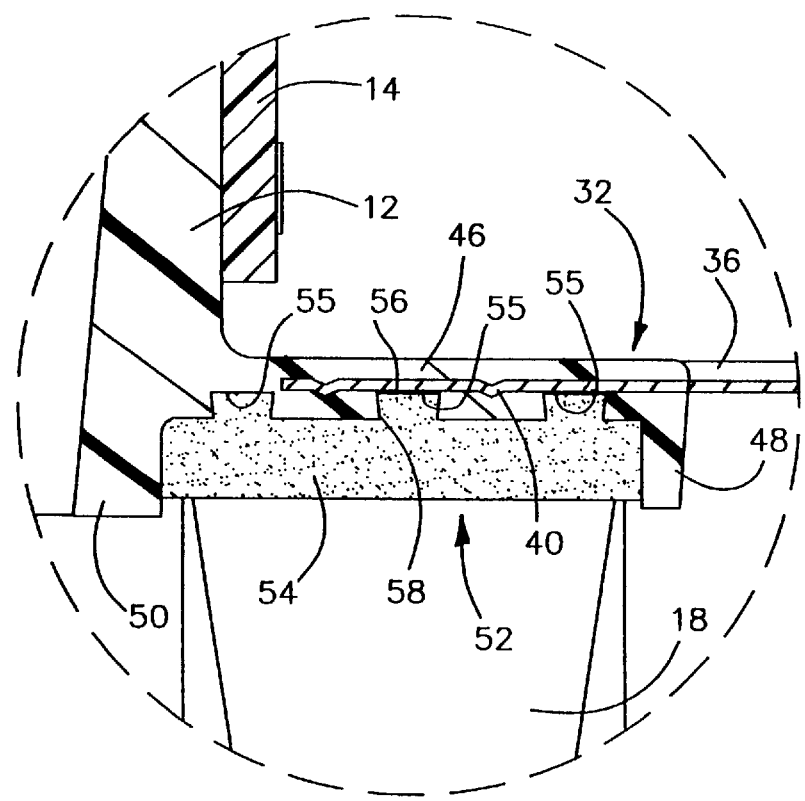
FIG. 3 is an enlarged view of detail A of FIG. 2 showing the connection of the filter element with the snout member.

At the second end cap 32, the snout member 12 has an annular flange portion 46 extending between an outer cylindrical arm 48 and an inner cylindrical wall 50 to form an annular cup-shaped recess 52 (FIG. 3). The cup-shaped recess 52 is sized to accept the other end of the filter element 18. The recess 52 provides a receptacle for potting material 54 so that, after the potting material 54 has been deposited, the other end of the filter element 18 may be inserted into the recess 52. The potting material 54 thereby sealingly bonds the filter element 18 to the second end cap 32. The potting material 54 at the second end cap 32 is preferably of the type which cures without requiring an outside source of heat, such as urethane, since the snout member 12 is made of an injection moldable material, and therefore may not pass heat efficiently. The permanent seal formed between both ends of the filter element 18 and the first and second end caps 30, 32 reduce the risk of unfiltered air bypassing the filter element to enter the air intake tube 14.

It is further noted that the center tube 28 is also potted at both ends to secure the center tube 28 in place and rigidify the housing 16. Similar to the filter element 18, the center tube 28 has one end potted at the first end cap 30 using plastisol. The other end of the center tube 28 is potted to the second end cap 32 using urethane. As noted above, the center tube 28 is preferably formed of expanded metal and therefore has excellent compressive strength. By potting the center tube 28 at both ends, the center tube 28 further rigidities the housing 16.

In the preferred embodiment, the snout member 12 has reverse draft grooves 55 for ensuring a sealing engagement between the filter element 18 and the second end cap 32. As noted above, the snout member 12 has a cup-shaped recess 52 which retains potting material and into which the filter element 18 is inserted. As best shown in FIG. 3, the snout member 12 has a plurality of circular grooves 55 concentric with the axis 26. The width of each groove 55 tapers so that each groove 55 has a base 56 of a given width and a neck 58 of a relatively smaller width. When deposited in the cup-shaped recess 52, the potting material 54 seeps into the grooves 55 and solidifies, thereby forming a mechanical, dove-tail engagement with the snout member 12. The mechanical engagement ensures that a seal is formed between the filter element 18 and the second end cap 32.

Figure 8:
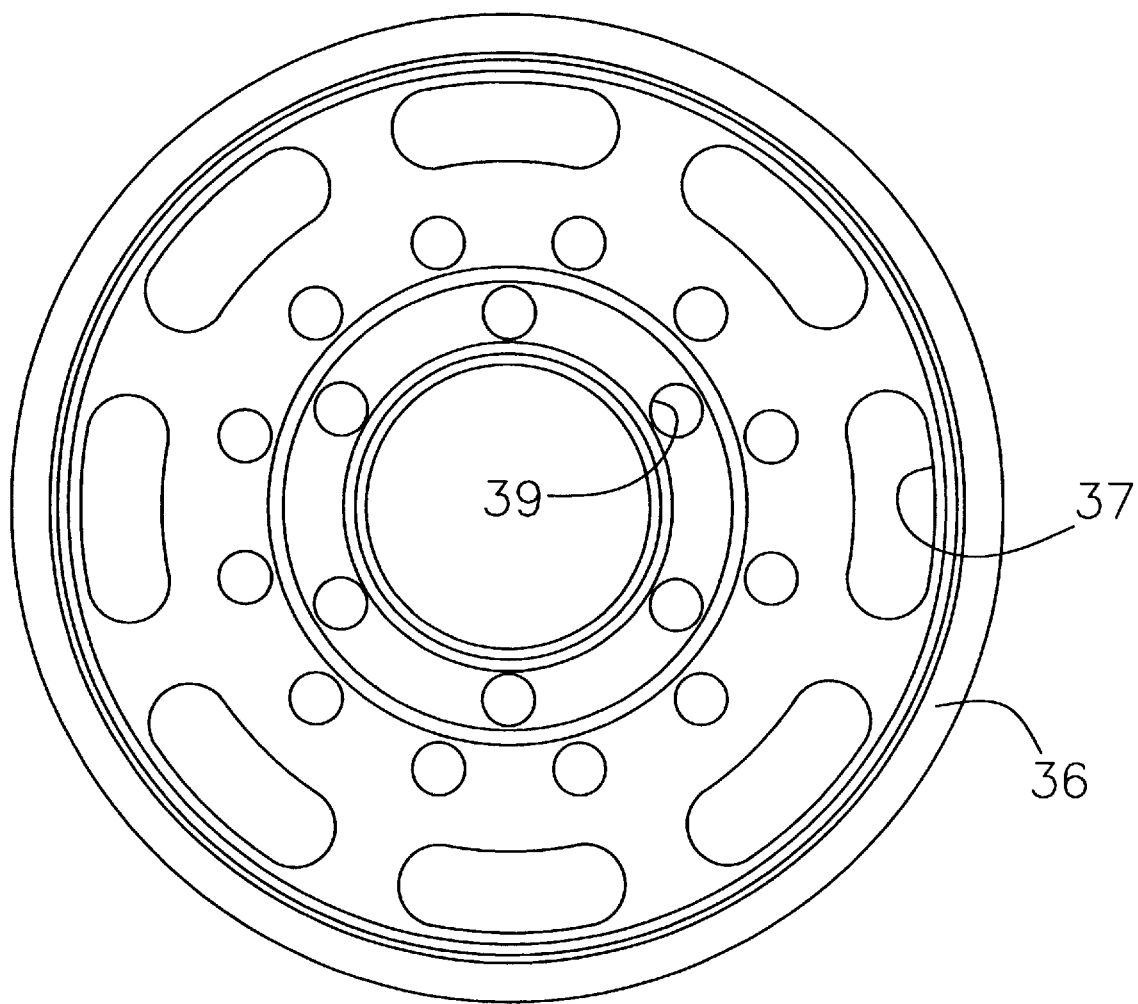
FIG. 8 is an enlarged front view detail of an outer ring.

In the preferred embodiment, the snout member 12 is injection molded. As a result, the snout member 12 is preferably formed from a material capable of being injection molded, such as a thermoplastic or a thermorubber. In the most preferred embodiment, the snout member 12 is made from a thermorubber known as SANTOPRENE. As noted above, the outer ring 36 is insert molded into the snout member 12. To carry out this process, the outer ring 36 is placed inside a mold and then snout member material is injected into the mold to form the snout member 12. The outer ring 36 has a plurality of holes 39 (FIG. 8) through which the material flows. Once the material has solidified, the material passing through the holes 39 mechanically connects the snout member 12 to the outer ring 36 to form the composite second end cap 32.

In forming the grooves 55, it has been found that a taper angle of approximately 5° with respect to the axis 26 is preferred. The injection molding process used to form the snout member 12 limits the taper angle, since the mold must be capable of being removed from the formed snout member 12. The snout member material is flexible and therefore allows the mold to be removed even when a certain amount of taper is present in the grooves 55. A 5° angle provides a sufficient dove-tail shape to form the mechanical seal and yet allows the snout member 12 to be released from the injection mold die when it is formed.

The snout member 12 further comprises an air outlet 60 for attachment to the air intake tube 14. As best shown in FIG. 2, the air outlet 60 of the present embodiment is sized for insertion into a flexible air intake tube 14. The air outlet 60 has an outer surface 62 which closely fits an inside diameter 64 of the intake tube 14. An orifice 66 extends through the air outlet 60 to allow filtered air from the inner bore 22 to pass through to the air intake tube 14. The orifice 66 is sufficiently sized so that the wall thickness of the air outlet 60 is rigid. Because the air outlet 60 is rigid, the air filter 10 may be connected to the air intake tube 14 using an adjustable band clamp 68.

It will be appreciated that the present invention provides an air filter 10 which is easily disposed with minimal harm to the environment. The materials used in the in the preferred embodiment are metal, paper, urethane, thermorubber, and plastisol. During the disposal process, the metal of the housing may be recycled by crushing and smelting. During smelting of the metal, the paper, thermorubber, and urethane burn relatively cleanly. While plastisol is not burned as easily, it has been found that the small amount of plastisol used in the air filter 10 (to pot only the first end cap 30) is readily burned during the melting step. As a result, the air filter 10 of the present invention is easily disposed of and recycled by crushing and smelting. If desired, the thermorubber may be removed from the filter and recycled separately.

In operation, the engine creates an inlet air flow through the air intake tube 14 which pulls outside air into the housing 16 through the inlets 37. The air flow then passes through the filter element 18 to the inner bore 22. The orifice 66 extending through the snout member 12 provides a passage for the air to exit the air filter 10 into the intake air tube 14 and subsequently to the engine.

Figure 5:
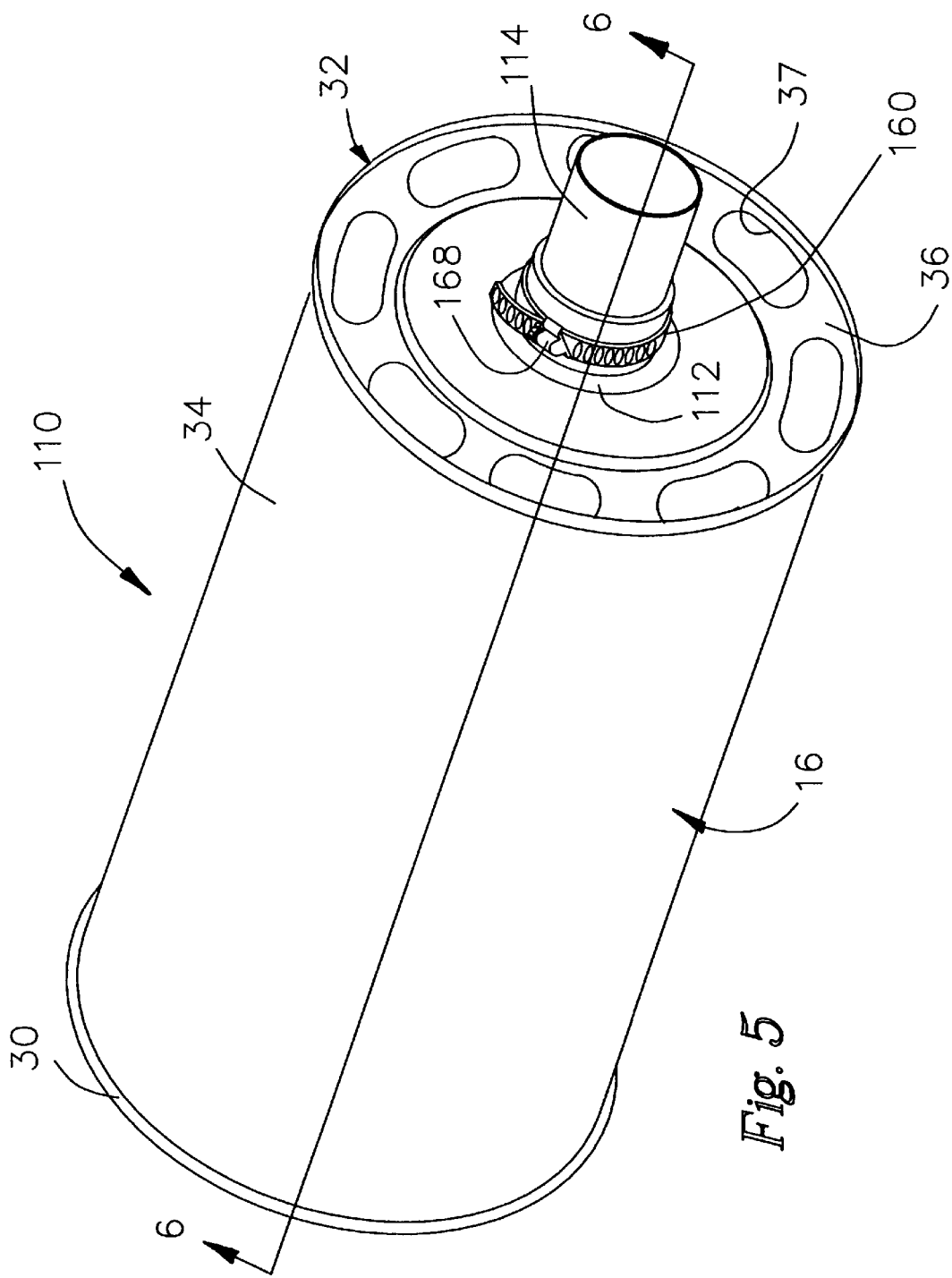
FIG. 5 is a perspective view of another embodiment of the air filter connected to a rigid air intake tube.
Figure 6:
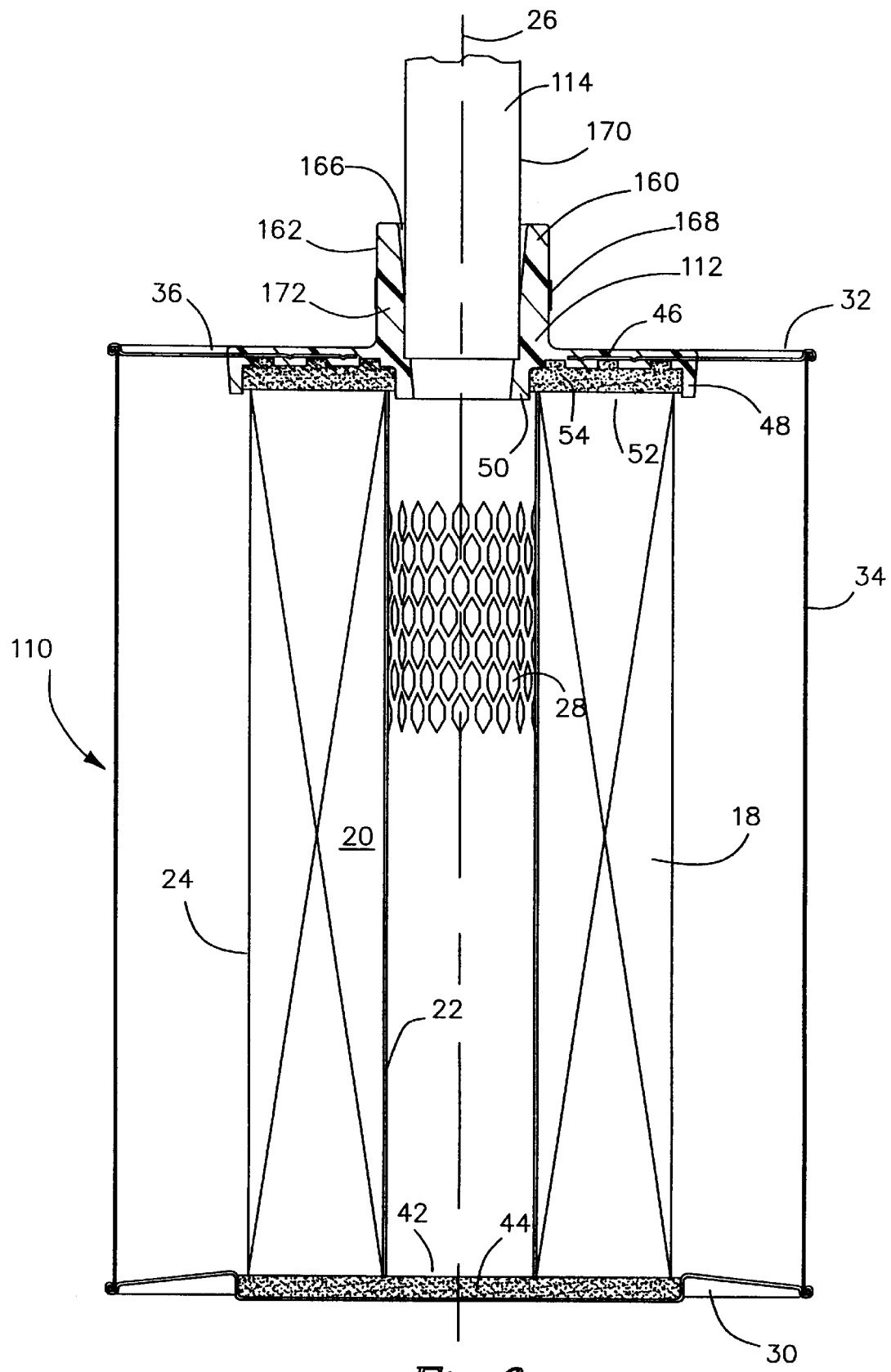
FIG. 6 is a cross-sectional side view of the second embodiment taken along line 6—6 of FIG. 5.

An alternative embodiment is illustrated in FIGS. 5 and 6 in which the air filter 110 has a flexible air outlet 160 sized for insertion over a rigid air intake tube 114. In this embodiment, the orifice 166 of the snout member 112 extending through the air outlet 160 is sized to accept the outside diameter 170 of a rigid air intake tube 114. The outside surface 162 of the air outlet 160 is appropriately sized to form a thin wall 172 which is flexible. The flexibility of the thin wall 172 allows the air filter 110 to be attached to the air intake tube 114 using an adjustable band clamp 168. Apart from the differences noted above, the air filter 110 of the second embodiment is identical to the air filter of the first embodiment.

From the foregoing, it will be appreciated that the present invention brings to the art a new and improved air filter. The air filter has a composite end cap comprising an outer ring for providing strength to the filter housing insert molded with a snout member which seals one end of the filter element and provides an air outlet for attachment to an air intake tube. The snout member may be formed for attachment to either a flexible or a rigid air intake tube. The heavy-duty housing protects the filter element from damage due to extreme temperatures and improper handling. The housing further provides an additional structure for mounting the air filter to a combustion engine. The filter element inside the housing is permanently sealed to the housing, thereby reducing the risk of unfiltered air from bypassing the filter element to enter the air intake tube.

What is claimed is:

1. An integral disposable air filter for attachment to an air intake hose of an engine, the air filter comprising in combination:

a cylindrical filter element defining an outer periphery and an inner bore, and having first and second ends;

a center support tube extending through the inner bore adjacent the filter element to radially support the filter element;

a first substantially rigid end cap having a central recess sized to receive a first end of the filter element;

potting material securing the first end of the filter element to the first end cap;

a second composite end cap comprising a substantially rigid metal outer ring injection molded with a snout member, the snout member having an inner cylindrical wall forming an air outlet adapted for attachment to the intake hose at one end, the other end of the snout member having a flange sized to receive the outer periphery of the second end of the filter element while leaving the inner cylindrical wall unobstructed, potting material securing the second end of the filter element to the second end cap;

a metal cylindrical casing located concentrically around the filter element, the casing fixed to the first and second end caps to form a housing.

2. The air filter of claim 1 in which the peripheral ends of the first and second end caps are rolled with the casing to form lock seams.

3. The air filter of claim 1 in which the air intake tube is flexible, and the air outlet formed by the snout member has an outer diameter sized for insertion into the air intake tube.

4. The air filter of claim 1 in which the air intake tube is rigid, and the air outlet formed by the snout member has an inner diameter sized for insertion over the air intake tube.

5. The air filter of claim 1 in which the snout member has a flange portion, and at least one reverse-draft groove is formed in the flange portion for receiving potting material.

6. The air filter of claim 1 in which the outer ring is formed with at least one concentric ridge.

7. The air filter of claim 1 in which the first end cap is formed of metal.

8. The air filter of claim 1 in which the outer ring of the second end cap is formed of metal.

9. The air filter of claim 1 in which the snout member is formed of a thermoplastic material.

10. The air filter of claim 1 in which the snout member is formed of a thermorubber material.

11. The air filter of claim 1 in which the potting material associated with the first end cap is plastisol.

12. The air filter of claim 1 in which the potting material associated with the second end cap is urethane.

13. The air filter of claim 1 in which the outer ring carries a plurality of holes for allowing snout member material to flow therethrough.

\* \* \* \* \*

UNITED STATES PATENT AND TRADEMARK OFFICE
CERTIFICATE OF CORRECTION

PATENT NO. : 5,919,279
DATED : July 6, 1999
INVENTOR(S) : Steven J. Merritt and Allen l. Liibbe It is certified that error appears in the above-indentified patent and that said Letters Patent is hereby corrected as shown below:

Cover page, under the subheading inventors, "Allen J. Liibbe" should read, - -Allen L. Liibbe - -.

Signed and Sealed this

Twenty-third Day of November, 1999

*Attest:*

Q. TODD DICKINSON

*Attesting Officer*     *Acting Commissioner of Patents and Trademarks*